(12) United States Patent
Beardmore (10) Patent No.: US 11,845,155 B2
(45) Date of Patent: Dec. 19, 2023

(54) ADJUSTABLE FLAG AND ASSEMBLY JIG INCLUDING AN ADJUSTABLE FLAG

(71) Applicant: Harcourt Industrial, Inc., Madison Heights, MI (US)

(72) Inventor: Dale Beardmore, Rochester Hills, MI (US)

(73) Assignee: Harcourt Industrial, Inc., Madison Heights, MI (US)

( * ) Notice: Subject to any disclaimer, the term of this patent is extended or adjusted under 35 U.S.C. 154(b) by 412 days.

(21) Appl. No.: 17/095,031

(22) Filed: Nov. 11, 2020

(65) Prior Publication Data

US 2021/0138597 A1 May 13, 2021

Related U.S. Application Data

(60) Provisional application No. 62/933,815, filed on Nov. 11, 2019.

(51) Int. Cl.
*B23Q 3/06* (2006.01)
*B23Q 3/10* (2006.01)

(52) U.S. Cl.
CPC .............. *B23Q 3/10* (2013.01); *B23Q 3/06* (2013.01); *B23Q 2703/12* (2013.01)

(58) Field of Classification Search
CPC ......... B23Q 3/10; B23Q 3/06; B23Q 2703/12
See application file for complete search history.

(56) References Cited

U.S. PATENT DOCUMENTS

| | | | | |
|---|---|---|---|---|
| 4,604,787 A * | 8/1986 | Silvers, Jr. | ............. | B23Q 7/046 414/730 |
| 2009/0096143 A1 * | 4/2009 | Wampler, II | ........... | B23Q 3/069 29/559 |
| 2011/0015647 A1 * | 1/2011 | Salisbury, Jr. | .......... | F16C 11/10 606/130 |
| 2016/0311085 A1 * | 10/2016 | Aguayo | ................... | B25B 11/02 |
| 2019/0275630 A1 * | 9/2019 | Ishida | ..................... | B23B 39/08 |
| 2020/0324394 A1 * | 10/2020 | Guay | ..................... | B25B 5/006 |

\* cited by examiner

*Primary Examiner* — Nirvana Deonauth
(74) *Attorney, Agent, or Firm* — William H. Honaker; Dickinson Wright PLLC (57) ABSTRACT

A flag for securing a work piece to an assembly jig comprises a base. At least one positioning member extends outwardly from the base for selectively pivoting about at least one axis. An end effector is connected to the at least one positioning member and defines an interaction point for engaging the work piece. A joining connection secures one of the at least one positioning member to another of the at least one positioning member. The joining connection has a first configuration and a second configuration. One of the at least one positioning member is moveable relative to another of the at least one positioning member in the first configuration. The joining connection defines at least one bore for receiving a dowel to secure one of the at least one positioning member to another of the at least one positioning member to lock the interaction point in the second configuration.

18 Claims, 6 Drawing Sheets

ADJUSTABLE FLAG AND ASSEMBLY JIG INCLUDING AN ADJUSTABLE FLAG

CROSS-REFERENCE TO RELATED APPLICATIONS

This application claims the benefit of U.S. Provisional Application Patent Ser. No. 62/933,815, filed on Nov. 11, 2019, the entire disclosure of which is hereby incorporated herein by reference in its entirety.

BACKGROUND OF THE INVENTION

1. Field of the Invention

The present invention generally relates to flags and more particularly improved flags that are selectively adjustable and lockable.

2. Description of the Prior Art

Flags are generally known in the art for securing work pieces to an assembly jig. The flag is typically attached to a frame and extends outwardly from the frame for engaging a work piece at a precise interaction point. The flag has an end effector which may, for example, be a clamp or an index bushing that only interacts with the work piece if the work piece is within a specified tolerance. The assembly jig may secure multiple work pieces adjacent to one another in a single cell to be welded to one another. The flags are typically non-adjustable and require additional modification by shims and other components placed between the frame and the flags. Once the flags are in the desired permanent positions, they are welded to the frame to provide consistently precise interaction points.

In order to circumvent the laborious process of using shims and other components to attain permanently precise interaction points, one solution is to implement adjustable flags instead of non-adjustable flags. Adjustable flags allows for a much quicker and less costly manufacture of the assembly jig. However, known adjustable flags lack the rigidity necessary to provide consistent repeatability in use and must ultimately be welded to the frame to provide the requisite rigidity. The resulting flags, while stable, are no longer adjustable.

SUMMARY OF THE INVENTION

In general terms, this invention provides an improved flag that better ensures stability, particularly a flag that is selectively adjustable and lockable. The flag of the present invention also precludes the need for additional custom components, such as shims, to adjust the position of the flag on a frame.

It is one aspect of the present invention to provide a flag for securing a work piece to an assembly jig. The flag comprises a base. At least one positioning member extends outwardly from the base for selectively pivoting about at least one axis. An end effector is connected to the at least one positioning member. The end effector defines an interaction point for engaging the work piece. A joining connection extends between one of the at least one positioning member and another of the at least one positioning member to secure one of the at least one positioning member to another of the at least one positioning member. The joining connection has a first configuration and a second configuration. One of the at least one positioning member is moveable relative to another of the at least one positioning member in the first configuration. One of the at least one positioning member is locked with another of the at least one positioning member in the second configuration. The joining connection defines at least one bore for receiving a dowel to secure one of the at least one positioning member to another of the at least one positioning member to lock the interaction point in the second configuration.

It is another aspect of the present invention to provide an assembly jig for securing a work piece. The assembly jig comprises a frame. At least one flag is connected to the frame for securing the work piece to the assembly jig. The at least one flag includes a base. At least one positioning member extends outwardly from the base for selectively pivoting about at least one axis. An end effector is connected to the at least one positioning member. The end effector defines an interaction point for engaging the work piece. A joining connection extends between one of the at least one positioning member and another of the at least one positioning member to secure one of the at least one positioning member to another of the at least one positioning member. The joining connection has a first configuration and a second configuration. One of the at least one positioning member is moveable relative to another of the at least one positioning member in the first configuration. One of the at least one positioning member is locked with another of the at least one positioning member in the second configuration. One of the joining connection defines at least one bore for receiving a dowel to secure one of the at least one positioning member to another of the at least one positioning member to lock the interaction point in the second configuration.

It is another aspect of the present invention to provide an assembly jig for securing a work piece. The assembly jig comprises a frame including a plurality of beams and a plurality of bracket assemblies. The plurality of beams are connected together by the plurality of bracket assemblies. Each of the plurality of bracket assemblies includes a plurality of braces secured to one another by a plurality of bolts. The plurality of braces are spaced from one another by the plurality of beams and sandwich the plurality of beams to form at least one joint. At least one flag is connected to the frame for securing the work piece to the assembly jig. The at least one flag includes a base. At least one positioning member extends outwardly from the base for selectively pivoting about at least one axis. An end effector is connected to the at least one positioning member. The end effector defines an interaction point for engaging the work piece. A hinged connection extends between one of the at least one positioning member and another of the at least one positioning member to secure one of the at least one positioning member to another of the at least one positioning member. The hinged connection has a first configuration and a second configuration. One of the at least one positioning member is moveable relative to another of the at least one positioning member in the first configuration. One of the at least one positioning member is locked with another of the at least one positioning member in the second configuration. One of the hinged connection defines at least one bore for receiving a dowel to secure one of the at least one positioning member to another of the at least one positioning member to lock the interaction point in the second configuration.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF A PREFERRED EMBODIMENT

Figure 1:
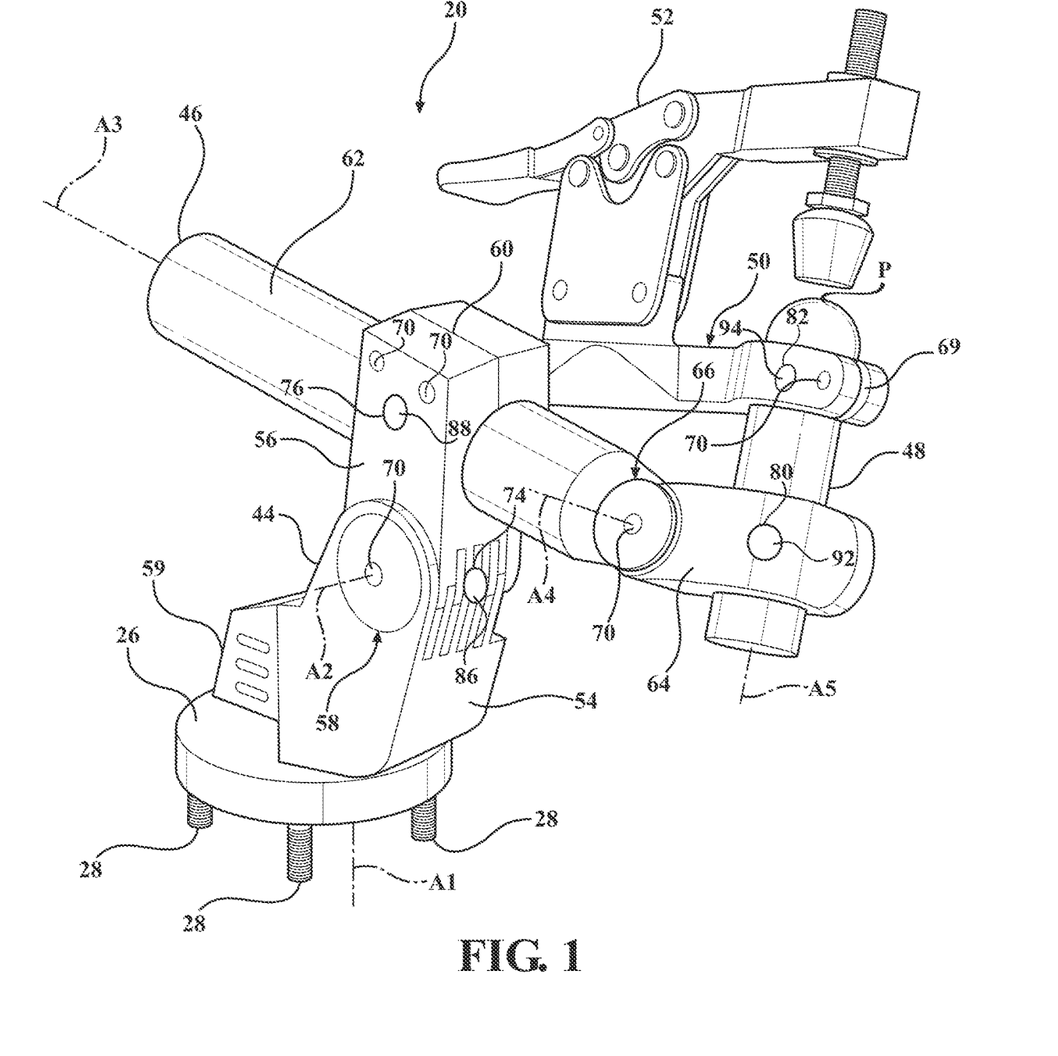
FIG. 1 is a perspective view of a flag according to one embodiment of the present invention.
Figure 2:
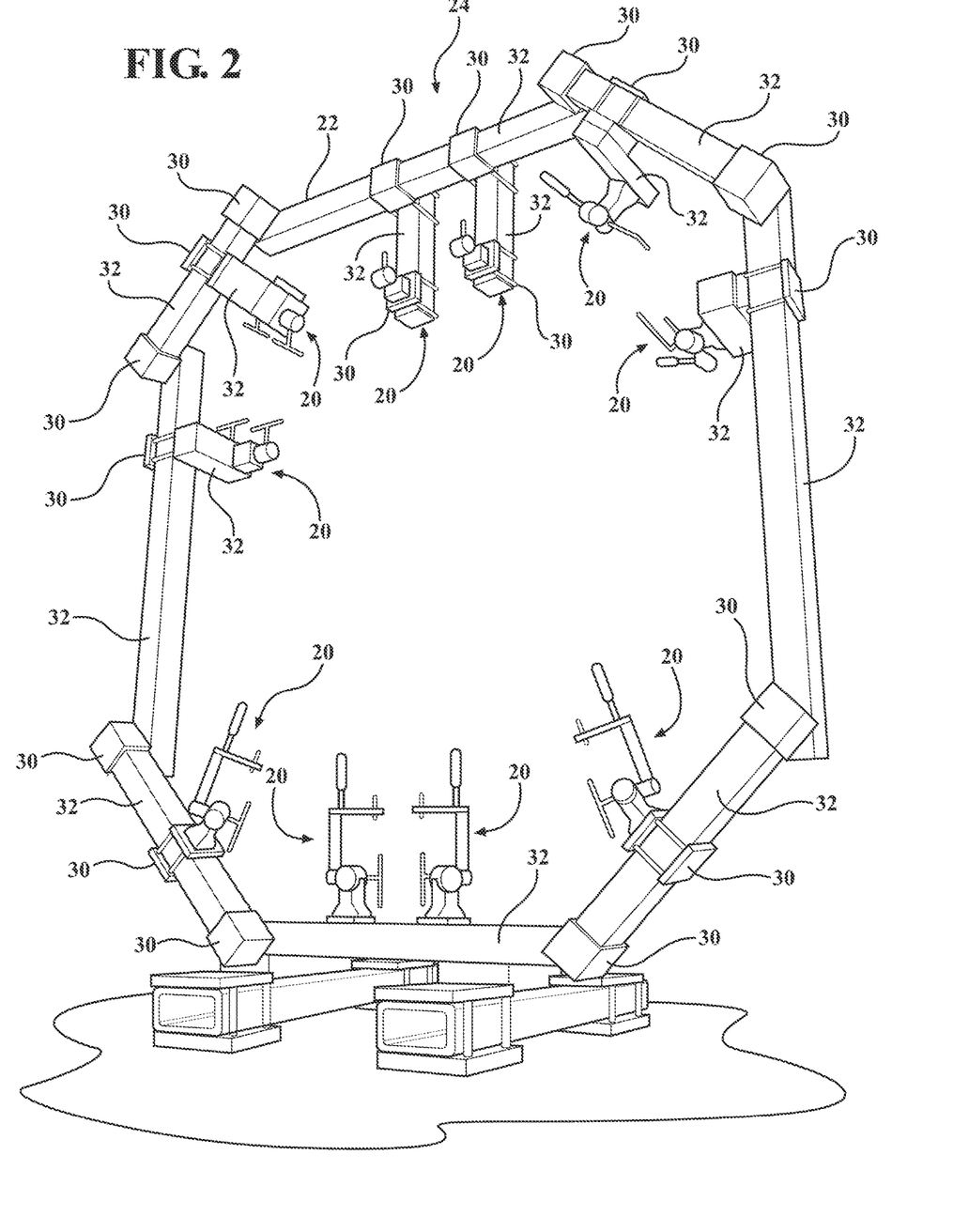
FIG. 2 is a perspective view of an assembly jig.

Referring to the Figures, wherein like numerals indicate corresponding parts throughout the several views, a flag 20 constructed in accordance with one embodiment of the present invention is generally shown in FIG. 1. Typically, flags 20 are secured to a frame 22 and hold work pieces in a pre-set position so they can be fastened together with high precision. FIG. 2 illustrates an example of the flags 20 of the present invention connected to a frame 22 to form an assembly jig 24.

Figure 4:
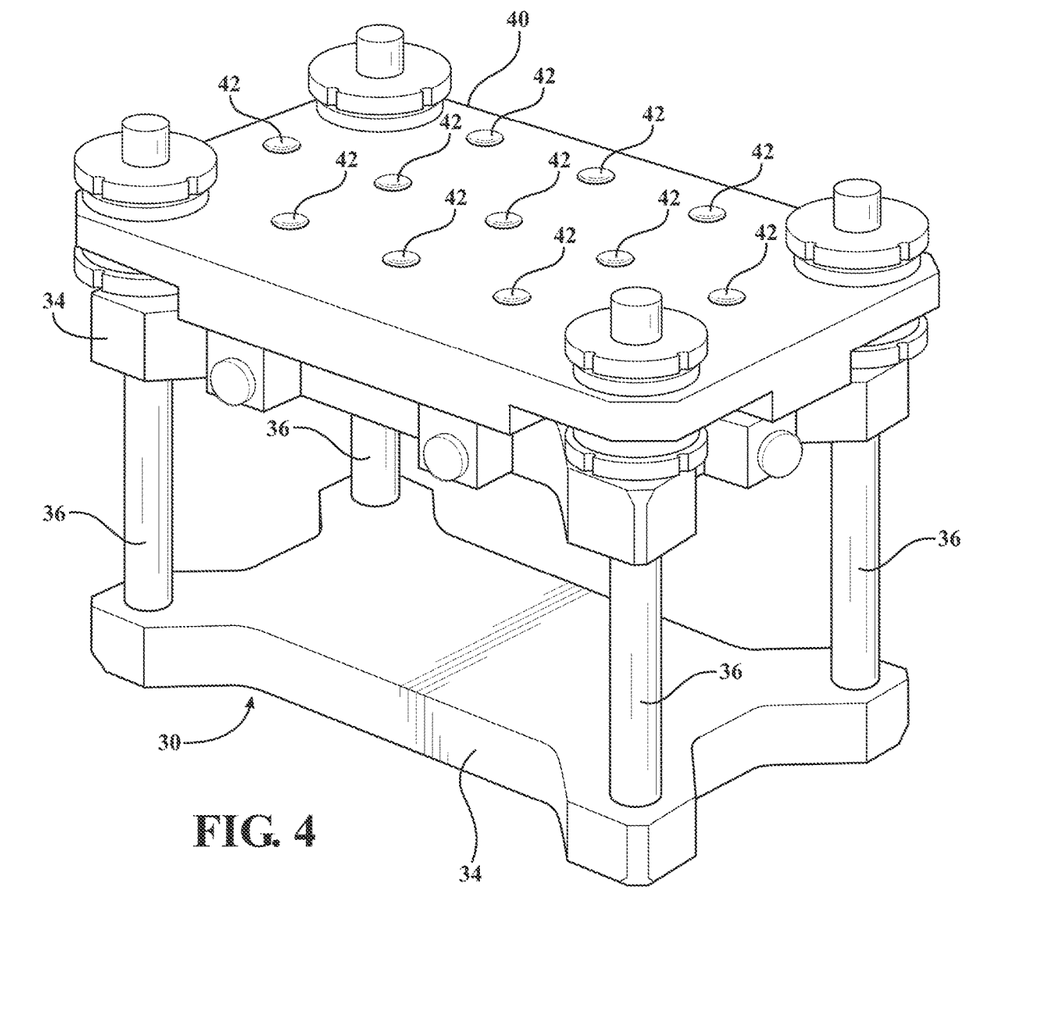
FIG. 4 is a perspective view of a plate attached to a bracket assembly of the assembly jig.

As best illustrated in FIG. 1, the flag 20 of the present invention includes a base 26 that has a generally circular shape and is configured to connect to a frame 22 via a plurality of securing members 28. It will be appreciated that any number of common fastening methods could be used, such as welding, soldering, integral formation, etc. Additionally, other methods could be used such as connection to a bracket assembly 30, as illustrated in FIG. 4. In this embodiment, the bracket assembly 30 is secured to the frame 22, and the flag 20 is bolted to the bracket assembly 30 via the plurality of securing members 28.

As best shown in FIG. 2, the assembly jig 24 includes the frame 22 and a plurality of flags 20 secured to the frame 22. A plurality of beams 32 are joined together to form the frame 22, and, in one embodiment of the present invention, the beams 32 are connected to one another by a plurality of bracket assemblies 30. Each bracket assembly 30 includes a plurality of braces 34 secured to one another by bolts 36 and other hardware, thereby eliminating welding and relieving stress on the frame 22. The plurality of braces 34 are spaced from one another by the plurality of beams 32 and sandwich the plurality of beams 32 to form at least one joint 38. When the bolts 36 are tightened, the plates squeeze the beams 32 together to create a rigid friction joint 38 which may impart the same rigidity as a weld. For example, the force required to move a bracket assembly 30 having 1 inch plates securing a 4 inch wide beam 32 may be at least 10,000 pounds.

Figure 3A:
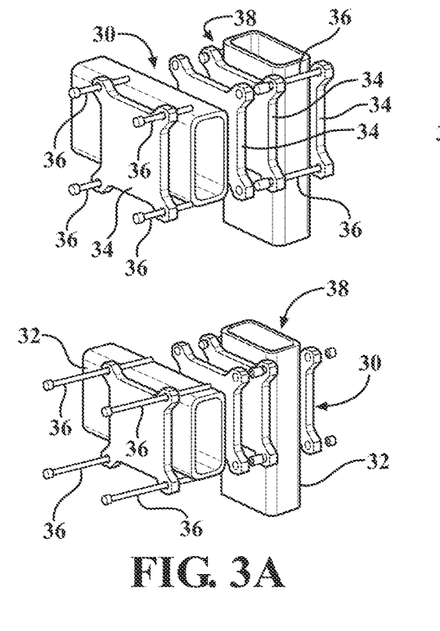
FIGS. 3A-3E are perspective views of various joints of the assembly jig.
Figure 3B:
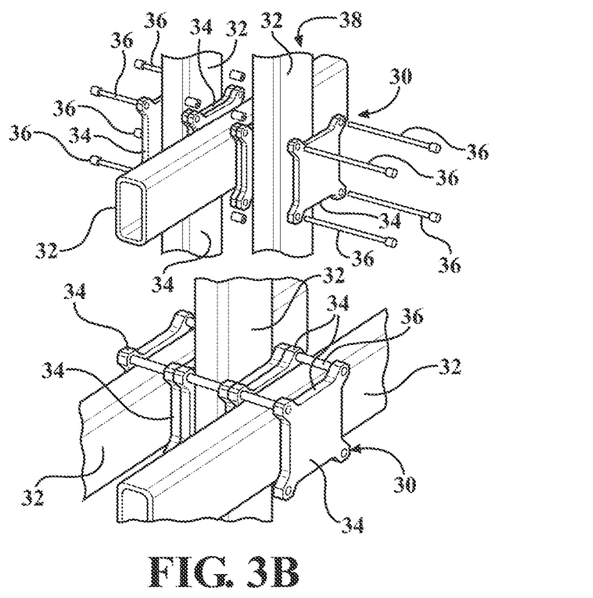
Figures 3C, 3D, 3E:
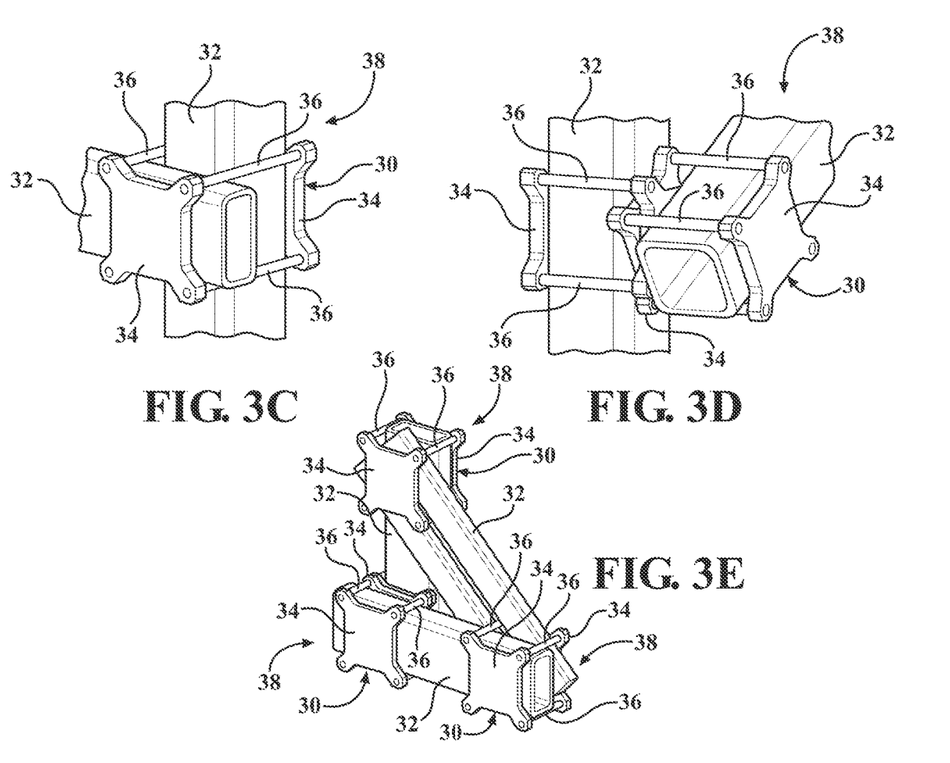

With reference to FIGS. 3a-3d, it should be appreciated that multiple types of joints 38 may be formed by the bracket assemblies 30 and beams 32, including a double box joint (FIG. 3A), a triple box joint (FIG. 3B), a squeeze joint (FIG. 3C), and a turn joint (FIG. 3D). In addition, a truss beam may be formed from the bracket assemblies 30 and the beams 32, as illustrated in FIG. 3E. The braces 34 may be sized between 5/16 inch to 1 inch wide with bolts 36 sized between 1/4 inch and 5/8 inch, but any number of sizes may be used to form the bracket assemblies 30.

The modular frame 22 allows for precise positioning of each joint 38 by adjustment of the bracket assemblies 30. Once the bracket assemblies 30 are secured to a permanent position, at least one rod is inserted between each brace 34 and the beams 32 to further ensure the rigidity of the frame 22 and provide for repeatability. In other words, the plurality of bracket assemblies 30 includes at least one rod extending between the plurality of braces 34 and the plurality of beams 32 to lock the at least one joint 38. It should be appreciated that rod may be received in pre-defined bores between the bracket assembly 30 and the plurality of beams 32, or the bores may be formed by machining after the position of each beam 32 is set.

Referring to FIG. 4, the assembly jig 24 also may also include a plate 40 attaching to one of the bracket assemblies 30 for precise, manual adjustment of components within the frame 22 about six degrees of freedom. In other words, the plate 40 is translatable in three directions (X, Y, Z) and rotatable about three axes (yaw, pitch, and roll). The plate 40 allows the integration of drill jigs, apply fixtures, header boards, and other high-tolerance fixed tooling to the assembly jig 24 via a plurality of mounting holes 42. Due to the compact and simple design of the plate 40, the position of the plate 40 may be quickly changed; for example, the plate 40 may be re-positioned by a trained operator within a few minutes. In addition, the plate 40 may have a tolerance as small as 0.004 inch.

Figure 5:
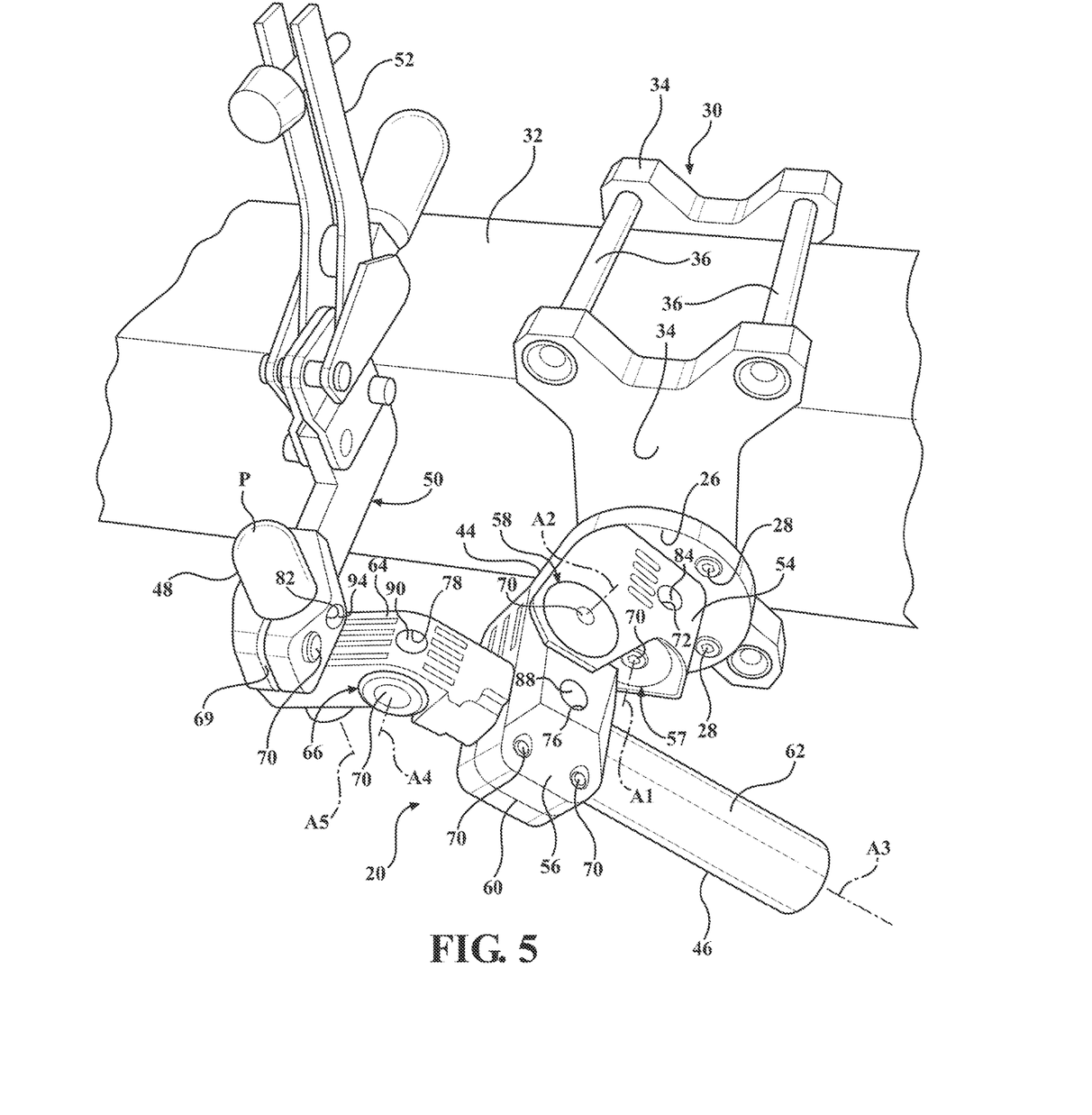
FIG. 5 is a perspective view of a flag according to another embodiment of the present invention.
Figure 6:
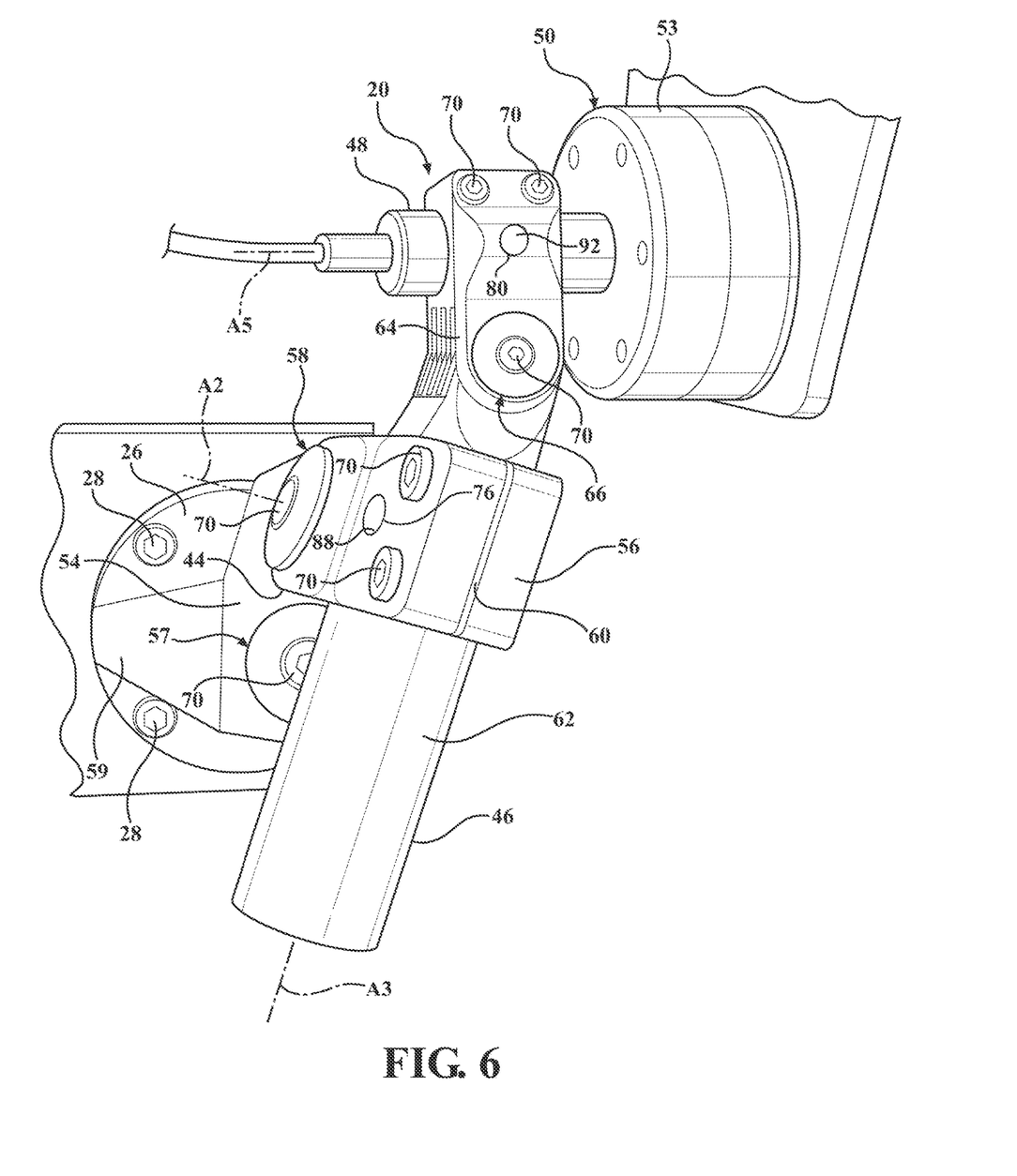
FIG. 6 is a perspective view of a flag according to yet another embodiment of the present invention.

Referring to FIGS. 1, 5, and 6, the flag 20 has a plurality of positioning members 44, 46, 48 connected to the base 26. The flag 20 includes a plurality of joining connections extending between a corresponding pair of the positioning members 44, 46, 48 or portions of each positioning member 44, 46, 48 to provide the flag 20 a broad positional range. Each joining connection has a first configuration and a second configuration. In the first configuration, one of the corresponding pair of positioning members 44, 46, 48 is moveable relative to the other of the corresponding pair of positioning members 44, 46, 48. In the second configuration, one of the corresponding pair of positioning members 44, 46, 48 is locked with the other of the corresponding pair of positioning members 44, 46, 48. The positioning members 44, 46, 48 include a first positioning member 44 that extends outwardly from the base 26, a second positioning member 46 that extends outwardly from the first positioning member 44, and a third positioning member 48 that extends outwardly from the second positioning member 46. An end effector 50 attaches to the third positioning member 48 and engages the work piece at an interaction point P. It should be appreciated that the end effector 50 may be a manual clamp 52 as illustrated in FIG. 1, or an automatic clamp 53 as illustrated in FIG. 6. In addition, the end effector 50 may be an index bushing having a round (4-way) or slotted (2-way) pin locator. The positioning members 44, 46, 48 provide for transversal and rotational movement, and it should be appreciated that the flag 20 may be positioned with at least six degrees of freedom. In other words, the interaction point P is translatable in three directions (X, Y, Z) and rotatable about three axes (yaw, pitch, and roll).

The first positioning member 44 has a first arm 54 and a first distal member 56. The first arm 54 is mounted to the base 26 and is pivotable about a first axis A1, and the first distal member 56 is mounted to the first arm 54 and is pivotable about a second axis A2. The second axis A2 extends generally perpendicular to the first axis A1. A first hinged connection 57 extends along the first axis A1 to allow the first arm 54 to rotate relative to the base 26. A second hinged connection 58 extends along the second axis A2 to allow the first distal member 56 to rotate toward the first arm 54. A foot 59 having a wedge shape extends outwardly from the base 26 to form the first hinged connection 57 and support the first arm 54. The first distal member 56 forms a first vise connection 60 disposed radially outwardly from the second hinged connection 58 for receiving the second positioning member 46.

The second positioning member 46 includes a second arm 62 that has generally cylindrical shape and is disposed in the first vise connection 60 and extends along a third axis A3. The third axis A3 extends generally perpendicular to the second axis A2. A second distal member 64 connects to the second arm 62 and is pivotable about a fourth axis A4 extending generally perpendicular to the third axis A3 through a third hinged connection 66. The third hinged connection 66 allows the second distal member 64 to rotate toward the second arm 62. When the first vise connection 60 is loosened, the second positioning member 46 is rotatable about the third axis A3 and displaceable along the third axis A3 to increase or decrease spacing from the first positioning member 44.

The second distal member 64 forms a second vise connection 68 disposed radially outwardly from the third hinged connection 66 for receiving the third positioning member 48. The third positioning member 48, having a generally cylindrical shape, is disposed in the second vise connection 68 and extends along a fifth axis A5, with the fifth axis A5 extending generally perpendicular to the fourth axis A4. The end effector 50 may form a third vise connection 69 for pivotally securing to the third positioning member 48, as illustrated in FIGS. 1 and 5, or may immovably attach to the third positioning member 48 as shown in FIG. 6. When the second vise connection 68 is loosened, the third positioning member 48 is displaceable along the fifth axis A5 to increase or decrease spacing from the second positioning member 46. When the third vise connection 69 is loosened, the end effector 50 is selectively rotatable about the fifth axis A5.

It should be appreciated that at least one tightening screw 70 extends between each of the positioning members 44, 46, 48. In particular, tightening screws 70 are disposed at each hinged connection 57, 58, 66 and at each vise connection 60, 68, 69. When the tightening screws 70 are fully tightened, the flag 20 may have at least the same stiffness and strength as solid aluminum. The positioning members 44, 46, 48 are positioned using an external metrology system, including laser trackers, for increased accuracy and improved true position tolerance. In particular, software may be implemented in operative communication with the external metrology system to accurately set the real world position of the flags 20.

The process of designing an assembly jig 24 with the flags 20 of the present invention begins with attaching the flags 20 to the work piece at pre-defined index points on the work piece, then kinematically jogging the flags 20 in the first configuration to align the base 26 of each flag 20 with a fixture and the frame 22. Once the position of each flag 20 is set to a fixed position with the tightening screws 70 and secured to the frame 22, the flag 20 is machined to form a plurality of bores 72, 74, 76, 78, 80, 82 extending between the positioning members at each hinged connection 57, 58, 66 and each vise connection 60, 68, 69. It should be appreciated that the bores 72, 74, 76, 78, 80, 82 may be pre-defined. In other words, the bores 72, 74, 76, 78, 80, 82 may be formed prior to physically mounting the flag 20 to the work piece or the frame 22. A plurality of dowels 84, 86, 88, 90, 92, 94 are disposed in the plurality of bores 72, 74, 76, 78, 80, 82 for ultimate stability.

In one embodiment, as shown in the Figures, the bores 72, 74, 76, 78, 80, 82 and the dowels 84, 86, 88, 90, 92, 94 are each cylindrically-shaped and extend generally perpendicular to the corresponding axes A1, A2, A3, A4, A5. In particular, the base 26 and the first arm 54 define a first bore 72 extending through the first hinged connection 57. A first dowel 84 is disposed in the first bore 72 to prevent the first arm 54 from rotating about the first axis A1. The first distal member 56 and the first arm 54 define a second bore 74 extending through the second hinged connection 58. A second dowel 86 is disposed in the second bore 74 to prevent the first distal member 56 from pivoting about the second axis A2. The first distal member 56 and the second arm 62 define a third bore 76 extending through the first vise connection 60. A third dowel 88 is disposed in the third bore 76 to prevent the second arm 62 from displacement along and about the third axis A3.

The second arm 62 and the second distal member 64 define a fourth bore 78 extending through the third hinged connection 66. A fourth dowel 90 is disposed in the fourth bore 78 to prevent the second distal member 64 from pivoting about the fourth axis A4. The second distal member 64 and the third positioning member 48 define a fifth bore 80 extending thorough the second vise connection 68. A fifth dowel 92 is disposed in the fifth bore 80 to prevent the third positioning member 48 from pivoting about the fifth axis A5. The third positioning member 48 and the end effector 50 define a sixth bore 82 extending through the third vise connection 69. A sixth dowel 94 is disposed in the sixth bore 82 to prevent the end effector 50 from pivoting about the fifth axis A5.

It should be appreciated that, in some embodiments, the hinged connections 57, 58, 66 and the vise connections 60, 68, 69 form the entirety of the joining connections. In other words, each hinged connection 57, 58, 66 may be a joining connection and each vise connection may be a joining connection 60, 68, 69. In some embodiments, the bores 72, 74, 76, 78, 80, 82 are defined by the joining connections and the dowels 84, 86, 88, 90, 92, 94 extend between the joining connections to lock the corresponding pair of positioning members 44, 46, 48 or other pieces of the flag 20 and lock the interaction point P in the second configuration.

The flags 20 of the present invention provide for decreased lead times in manufacturing the assembly jig 24. Due to the adjustability of the positioning members 44, 46, 48, as well as the stability of the doweled connections, the flag 20 may eliminate the need for custom-made risers, angles, locators, shims, and other costly parts. More specifically, the doweled connections allow for one simple, cost-effective modification to the assembly jig 24 to provide ultimate stability to the flags 20. Although a simple dowel connection is shown in the Figures, it will be appreciated that any number of common doweled connections could be implemented to lock the positioning members 44, 46, 48 together, such as slot-and-key, cross-doweling, etc.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A flag for securing a work piece to an assembly jig, said flag comprising:

a base;

at least one positioning member extending outwardly from said base for selectively pivoting about at least one axis;

an end effector connected to said at least one positioning member, with said end effector defining an interaction point for engaging said work piece;

a joining connection extending between one of said at least one positioning member and another of said at least one positioning member to secure the one of said at least one positioning member to the another of said at least one positioning member;

said joining connection having a first configuration and a second configuration, with the one of said at least one positioning member being moveable relative to the another of said at least one positioning member in said first configuration, and with the one of said at least one positioning member being locked with the another of said at least one positioning member in said second configuration; and wherein said joining connection defines at least one bore for receiving a dowel to secure the one of said at least one positioning member to the another of said at least one positioning member to lock said interaction point in said second configuration.

2. The flag as set forth in claim 1 wherein said base is mounted to a frame of said assembly jig; and
wherein said interaction point is moveable about six degrees of freedom relative to said frame.

3. The flag as set forth in claim 2 wherein said frame includes a plurality of beams and a plurality of bracket assemblies, with said plurality of beams connected together by said plurality of bracket assemblies; and
each of said plurality of bracket assemblies including a plurality of braces secured to one another by a plurality of bolts, wherein said plurality of braces are spaced from one another by said plurality of beams and sandwich said plurality of beams to form at least one joint.

4. The flag as set forth in claim 1, wherein said end effector is a manual clamp.

5. The flag as set forth in claim 1 wherein said end effector is an automatic clamp.

6. The flag as set forth in claim 1, wherein said end effector is an index bushing.

7. The flag as set forth in claim 1, wherein said joining connection is a vise connection.

8. The flag as set forth in claim 1, wherein said joining connection is a hinged connection.

9. The flag as set forth in claim 1 wherein said joining connection is a plurality of joining connections each associated with and extending between a corresponding pair of said at least one positioning member, with said dowel including a plurality of dowels; and
wherein one of said plurality of dowels extends between each of said plurality of joining connections to lock said corresponding pair of said at least one positioning member.

10. An assembly jig for securing a work piece, comprising:
a frame;
at least one flag connected to said frame for securing said work piece to said assembly jig, said at least one flag including:
a base;
at least one positioning member extending outwardly from said base for selectively pivoting about at least one axis;

an end effector connected to said at least one positioning member, with said end effector defining an interaction point for engaging said work piece;

a joining connection extending between one of said at least one positioning member and another of said at least one positioning member to secure the one of said at least one positioning member to the another of said at least one positioning member;

said joining connection having a first configuration and a second configuration, with the one of said at least one positioning member being moveable relative to the another of said at least one positioning member in said first configuration, and with the one of said at least one positioning member being locked with the another of said at least one positioning member in said second configuration; and wherein said joining connection defines at least one bore for receiving a dowel to secure the one of said at least one positioning member to the another of said at least one positioning member to lock said interaction point in said second configuration.

11. The assembly jig as set forth in claim 10, wherein said frame includes a plurality of beams and a plurality of bracket assemblies, with said plurality of beams connected together by said plurality of bracket assemblies; and
each of said plurality of bracket assemblies including a plurality of braces secured to one another by a plurality of bolts, wherein said plurality of braces are spaced from one another by said plurality of beams and sandwich said plurality of beams to form at least one joint.

12. The assembly jig as set forth in claim 11, wherein said plurality of bracket assemblies includes at least one rod extending between said plurality of braces and said plurality of beams to lock said at least one joint.

13. The assembly jig as set forth in claim 10, wherein said interaction point is moveable about six degrees of freedom relative to said frame.

14. The assembly jig as set forth in claim 10, wherein said end effector is a manual clamp.

15. The assembly jig as set forth in claim 10, wherein said end effector is an automatic clamp.

16. The assembly jig as set forth in claim 10, wherein said end effector is an index bushing.

17. The assembly jig as set forth in claim 11, wherein said joining connection is a plurality of joining connections each associated with and extending between a corresponding pair of said at least one positioning member, with said dowel including a plurality of dowels; and
wherein one of said plurality of dowels extends between each of said plurality of joining connections to lock said corresponding pair of said at least one positioning member.

18. An assembly jig for securing a work piece, comprising:
a frame including a plurality of beams and a plurality of bracket assemblies, with said plurality of beams connected together by said plurality of bracket assemblies;
each of said plurality of bracket assemblies including a plurality of braces secured to one another by a plurality of bolts, wherein said plurality of braces are spaced from one another by said plurality of beams and sandwich said plurality of beams to form at least one joint;
at least one flag connected to said frame for securing said work piece to said assembly jig, said at least one flag including:

a base;

at least one positioning member extending outwardly from said base for selectively pivoting about at least one axis;

an end effector connected to said at least one positioning member, with said end effector defining an interaction point for engaging said work piece;

a hinged connection extending between one of said at least one positioning member and another of said at least one positioning member to secure the one of said at least one positioning member to the another of said at least one positioning member;

said hinged connection having a first configuration and a second configuration, with the one of said at least one positioning member being moveable relative to the another of said at least one positioning member in said first configuration, and with the one of said at least one positioning member being locked with the another of said at least one positioning member in said second configuration; and wherein said hinged connection defines at least one bore for receiving a dowel to secure the one of said at least one positioning member to the another of said at least one positioning member to lock said interaction point in said second configuration.

* * * * *